United States Patent [19]

Le Loarer et al.

[11] Patent Number: 5,026,421
[45] Date of Patent: Jun. 25, 1991

[54] POLISHING COMPOSITIONS BASED ON CERIUM AND PROCESS FOR THE PREPARATION THEREOF

[75] Inventors: Jean-Luc Le Loarer, La Rochelle; Francis Tastu, Nieul/Sur/Mer, both of France

[73] Assignee: Rhone-Poulenc Chimie, Courbevoie, France

[21] Appl. No.: 457,587

[22] Filed: Dec. 27, 1989

Related U.S. Application Data

[63] Continuation of Ser. No. 282,314, Dec. 9, 1988, abandoned.

[30] Foreign Application Priority Data

Dec. 9, 1987 [FR] France .................. 87 17129

[51] Int. Cl.$^5$ ................................ C09G 1/00
[52] U.S. Cl. ...................................... 106/3
[58] Field of Search ............................ 106/3

[56] References Cited

U.S. PATENT DOCUMENTS

| 4,601,755 | 7/1986 | Melard | 106/3 |
| 4,769,073 | 9/1988 | Tatsu | 106/3 |
| 4,786,325 | 11/1988 | Melard | 106/3 |

FOREIGN PATENT DOCUMENTS

2638173 3/1977 Fed. Rep. of Germany .
852926 8/1981 U.S.S.R. .

*Primary Examiner*—William R. Dixon, Jr.
*Attorney, Agent, or Firm*—Burns, Doane, Swecker & Mathis

[57] ABSTRACT

An improved glass polishing composition that contains ceric oxide and a boron compound. A process for the preparation of this composition is also disclosed. The polishing composition has improved suspension properties while still maintaining a high polishing efficiency.

33 Claims, No Drawings

POLISHING COMPOSITIONS BASED ON CERIUM AND PROCESS FOR THE PREPARATION THEREOF

BACKGROUND OF THE INVENTION

1. Reference to Related Applications

This application is a continuation of U.S. Pat. application, Ser. No. 07/282,314 filed Dec. 9, 1988 now abandoned.

2. Field of the Invention

The present invention relates to improved polishing composition based on cerium, a process for the preparation thereof, and to the use of such compositions for the polishing of glass, ceramics, and other materials of vitreous type.

More specifically, the present invention relates to improved cerium/boron polishing compositions having enhanced properties relative to their stability in suspension and there ability to be redispersed after sedimentation.

3. Description of the Prior Art

At the present time, the most effective polishing compositions for the polishing of inorganic glasses are generally those based on the rare earths and, in particular, those based on cerium.

Thus, polishing compositions based on ceric oxide and surrounded by a mineral gangue consisting of anions, in particular fluorides and phosphates, are proposed in French Patent No. 2,472,601. Ceric oxide combined with an oxide of another rare earth is disclosed in French Patent No. 2,545,830. Likewise, ceric oxide combined with a phase consisting of rare earth pyrosilicate is disclosed in French Patent No. 2,549,846.

Polishing abrasives such as clays and aluminum silicates are described in U.S. Pat. No. 3,071,479.

Soviet Patent No. 852-926 relates to the combination of boric oxide or boric acid with a mixture of rare earth metal carbonates followed by heat treating the combination at 900° to 950° C.

A process of preparing polishing agents by spray roasting a salt of rare earth oxides or cerium to produce a polishing powder with a narrow range of particle sizes is described in DT 2638173.

The aforementioned polishing compositions have the desired polishing characteristics. These characteristics are:

(i) effectiveness, i.e., to polish a glass surface as rapidly as possible;

(ii) compatibility, i.e., not to scratch the glass surface while polishing;

(iii) not cause detrimental surface reactions, i.e., not being excessively reactive relative to the glass and not promoting problems of burning, orange peel, blistering and the like;

(iv) have a very long shelf life, while remaining stable;

(v) have good stability, that is, distribution of powder in the suspension thereby avoiding deposits; this dispersion must be effective at the time the suspension is prepared and must remain effective during the entire duration of the work;

(vi) no foaming; foam causes overflows, clogging in the piping, which thereby reduces yield;

(vii) easy to resuspend after a long duration of time even if the solution is filled with elements of polished glass, the so called "caking" phenomenon;

(viii) non-toxic, in order to prevent diseases of the skin and other areas;

(ix) uniform in consistency, agreeable color, and easy to use;

(x) not adhere to the glass after polishing, thereby permitting rapid cleaning; and (xi) easy to flocculate thereby assisting in the elimination of waste material.

However, a further requirement of polishing compositions generally utilized in a spray type polishing system is that these polishing compositions should be homogeneously suspended in water. This property is desired, since the components of the polishing system tend to settle and the phenomenon of caking then likely results.

There are two types of caking phenomenon. "Initial" caking refers to the freshly prepared product. In fact, users often prepare their suspension in advance at the concentration desired and store it until the machines are available for use. A period of time, which may amount to several days, elapses between the preparation of the suspension and its use, during which time settling occurs. During this waiting period, two physical phenomenon may occur: the composition forms an expanded, non-homogeneous layer upon settlement; or the solution present on the bottom of the reservoir assumes a slushy, adhesive property, similar to that of concrete.

In the first case, the settlement of the product is instantaneous. However, the product may be resuspended, and the intended concentration may be recovered.

If, on the other hand, there is a settlement of the second kind, only part of the product can be resuspended, leading to a decrease in the concentration of the solution of the polishing composition. In extreme cases, the caking is so extreme that it is impossible to release the product from the bottom of the reservoir. The result is a loss of the polishing agent.

In contrast, caking may appear in machines after the product has been utilized. In the case of polishing under severe conditions (high velocity, strong pressures), the polishing agent undergoes noticeable mechanical wear including fracture of agglomerates and a decrease in the size of grains into very fine particles. On the other hand, the suspension may become enriched in exogenous particles such as silicates which can be recovered from the glass. The combination of these factors results in the product settling into the piping and the reservoirs in the form of a consistent and gluey sludge. Caking then takes place upon re-starting the machine. Resuspension of the polishing composition is very difficult and in extreme cases impossible.

In view of the numerous disadvantages experienced when caking and settling are appreciable, attempts were made to improve the suspension properties of polishing compositions containing cerium oxide. According to French Patent No. 1,263,505, ceric oxide was combined with a gelatinous ceric hydroxide. The gelatinous ceric hydroxide was formed by the reaction of a soluble cerium salt with either a base, a hydrolyzable salt or a which salt generates anions in solution. The base is combined with cerium ions in solution to form a gelatinous material. Other bases include sodium, potassium, ammonium hydroxides, and hydrated or anhydrous sodium metaborate.

However, this gelatinous polishing composition risks glazing the polisher, thereby reducing the efficiency of the polishing operation. Therefore there is a need in the art to provide a polishing composition that does not cake, is easily resuspendable in solution, and has a high efficiency in polishing glass.

SUMMARY OF THE INVENTION

One of the objects of the present invention is to provide an improved ceric oxide based polishing composition containing certain additives that improve the settlement and caking properties of the polishing composition.

A further object of the present invention is to provide a polishing composition containing additives that do not reduce the polishing efficiency.

Yet another object of the present invention is to provide a polishing composition containing additives that are not harmful to the glass surface and lead to satisfactory polishing of the glass.

Accordingly, the polishing composition of the present invention provides a polishing agent based on ceric oxide and as an additive, a boron compound.

These and other objects, features and advantages will be apparent from the following more particular description of the preferred embodiments.

DESCRIPTION OF THE PREFERRED EMBODIMENTS

The present applicants have discovered that the presence of a boron compound in an adequate quantity in the suspension of a glass polishing agent reduces caking and settlement.

According to the present invention, the polishing agent may be ceric oxide by itself or a composition based on ceric oxide. In the following description of the present invention, ceric oxide is defined as ceric oxide alone or in the form of a composition. The ceric oxide used according to the invention may be ceric oxide having the following physicochemical properties.

Ceric oxide may be present in powder form having particles with dimensions less than approximately 20 $\mu$m. Preferably, a ceric oxide with dimensions between 0.1 $\mu$m and 10 $\mu$m is used. Grain size analysis may be carried out by means of a SEDIGRAPH 5000 D instrument, which measures the rate of sedimentation of the particles in suspension and automatically displays the results in a cumulative percentage distribution as a function of equivalent spherical diameters (based on Stokes's law).

The specific surface area of ceric oxide may vary between 1 and 35 $m^2/g$ and preferably the ceric oxide has a specific surface area between 3 and 10 $m^2/g$. The surface area may be determined by the BRUNAUER-EMMET-TELLER method, described in the Journal of the American Chemical Society, vol. 60, p. 309 (1938).

The purity of the ceric oxide used in immaterial. Therefore, a very pure ceric oxide commercially available compound under the trade name of Opaline may be used. Opaline is marketed by RHONE-POULENC Co. and has a purity of higher than 99%. It is also possible to use a ceric oxide combined with one or several other rare earth oxides and/or one of several salts. Preferably, a polishing composition containing at least about 30% by weight of ceric oxide is used.

Ceric oxide contained in compositions are described in French Patent No. 2,472,601. These compositions are obtained by a process which consists of mixing simultaneously and continuously a cerium salt solution, a basic solution and a solution of at least one acid and/or a salt the anion or anions of which are capable of forming insoluble rare earth compounds. The number of basic equivalents introduced are higher than or equal to the number of cerium equivalents. The pH of the reaction medium is usually higher than 6. The precipitate formed is then filtered, dried and calcined.

In the first stage, the reagents are mixed together. The solution of cerium salt may be any aqueous solution of a cerium salt in the cerous and/or ceric state. The solution should be soluble under the conditions of the invention. In particular, a solution of cerous chloride or cerium nitrate in the cerous or ceric state or a mixture thereof is preferred.

The concentration of the solution of the cerium salt is not critical and it may vary within broad limits. A concentration of cerium salt between 0.5 and 2 moles per liter is preferred.

The cerium is introduced into the reaction medium preferably in the cerous state and is oxidized into the ceric state by continuously adding an oxidizing agent that is compatible with the medium to the reaction mixture. The cerium may be added either individually or in a mixture with a solution other than that containing the base. Among the suitable oxidizing agents are solutions of sodium, potassium or ammonium perchlorate, chlorate, hypochlorite, persulfate, hydrogen peroxide or air, oxygen or ozone. It is also possible to oxidize the cerium electrochemically. Hydrogen peroxide is preferably used.

The proportion of the oxidizing agent relative to the cerous salt to be oxidized may vary within wide limits. The proportion is generally higher than the stoichiometry and preferably corresponds to an excess of between 10% and 40%.

The basic solution utilized may be an aqueous solution of ammonia, sodium hydroxide or potassium hydroxide and preferably an ammonia solution is used The normality of the basic solution is not critical and may vary within wide limits. Advantageously, however, it is preferably between 1 and 5 N.

The proportion of the basic solution and the cerium salt solution is such that the number of basic equivalents introduced is higher than or equal to the number of cerium equivalents introduced at the same time. Advantageously, an excess of more than 5% of basic equivalents relative to the cerium equivalents is preferable. The pH of the reaction medium, which should be higher than 6, should also not exceed about 10. The pH is advantageously kept between 7 and 9. It may be particularly advantageous to control the pH within these limits at a value constant within ±0.1 pH units.

The solution of at least one acid and/or salt the anion or anions of which are capable of forming insoluble rare earth compounds, may be any aqueous solution of an acid and/or a salt. The anion of the salt may be selected from the group consisting of at least one of the following: oxalate, fluoride, carbonate, borate, silicate, sulfate, and phosphate. The salt or salts used, in the present invention, are soluble in water and preferably are salts of ammonium, sodium or potassium. This solution is introduced into the reaction medium by itself or in a mixture with the basic solution. Preferably, salts and anions of fluoride, sulfate, borate or phosphate and the like, are used.

The concentration of the acid and/or salt solution is not critical and may vary within wide limits. However, it is preferable to have the concentration at less than 6 moles per liter and more particularly between 2 and 4 moles per liter.

According to the process described in French Patent No. 2,472,601, it is possible to further add either continuously to the reaction mixture, or in a mixture with the cerium salt solution, an aqueous solution of a salt of at least one trivalent rare earth optionally containing yttrium. This trivalent rare earth should be soluble under the conditions of the invention. Suitable salts include the chlorides or nitrates of lanthanum, praseodymium, neodymium, samarium, europium, gadolinium, terbium, dysprosium, holmium, erbium, thulium, ytterbium, lutecium, yttrium and the like. In particular, a solution containing the cerium salt and salts of rare earths may be used. Those salts may originate directly or indirectly in the treatment of the rare earth minerals.

The concentration of the solution of the rare earth salt or salts utilized in the present invention is not critical and may vary within wide limits. However, it is preferable for the concentration to be between 0.2 and 1 mole per liter.

The aforementioned different reagents are then mixed. It should be noted that the number of anionic equivalents employed should be higher than or equal to the number of cationic equivalents used. The temperature of the reaction medium should preferably be between about 20° C. and 95° C. and more particularly between 50° C. and 70° C. The retention time of the mixture in the reaction medium is not critical and may vary within wide limits. Generally retention times between 30 minutes and 2 hours, are preferred.

The reaction mass may be aged for a certain period of time at a temperature between about 20° C. and 95° C., preferably between 50° C. and 80° C., prior to filtering the suspension. In this case, the aging time is not critical and may vary within wide limits. However, a period of up to 2 hours is preferred.

The second stage of the process of the preparation of the composition described in French Patent No. 2,472,601, consists of filtering the reaction mass which is in the form of a suspension. After filtering, the filter gate may than be washed with water or a solution of an ammonium salt.

The product obtained after filtering and optional washing is then dried either continuously or noncontinuously. The drying temperature is preferably between 100° C. and 600° C. The drying time is not critical and may vary between 30 minutes and 24 hours.

The dry product is then calcined at a temperature between 600° C. and 1200° C., generally for about 30 minutes to 2 hours. The calcination may be performed continuously or noncontinuously.

The composition obtained by the process described above may be ground and exposed to grain size selection in a manner such that the above defined grain size distribution is obtained. These operations are carried out by methods well known to those skilled in the art. Conventional apparatuses, such as a hammer mills or toothed roll crushers for grinding and air jet turbines or hydrocyclones for selecting the grain size and the like may be used.

According to the present invention, ceric oxide based compositions obtained by the above-described process are generally used in the composition. Anions such as fluoride, sulfate, borate or phosphate are also preferably used.

Ceric oxide in the form of compositions described in French Patent No. 2,549,846 may also be used in the present invention. These compositions contain a crystallographic phase of the $CeO_2$ type and a crystallographic phase consisting of a rare earth pyrosilicate corresponding to the formula $Ln_{2-x}Ce_x Si_2O_7$, in which Ln represents at least one element selected from the group consisting of the lanthanides and yttrium and in which x is greater than or equal to 0 and less than 2.

The compositions described in French Patent No. 2,549,846 corresponds to the following chemical analysis:

(i) 75% to 95% by weight of rare earths expressed in oxides with a proportion of ceric oxide relative to the total weight of rare earth oxides varying between 60% to 85%, and (ii) 5% to 25% by weight silicon expressed as $SiO_2$.

They also contain essentially two crystallographic phases: one phase of the $CeO_2$ type with a cubic structure and a phase of rare earth pyrosilicate $Ln_{2-x}Ce_x Si_2O_7$, with an orthorhombic structure wherein x is greater than or equal to 0 and less than 2. Preferably, x is greater than or equal to 0 and less than or equal to 0.2. They also contain lesser quantities of a rare earth oxide phase, generally a $Ln_2O_3$ sesquioxide with a cubic, fluorine type structure and a silicon dioxide, $SiO_2$, type structure in the vitreous or crystallized form.

The proportions of the different phases may vary as a function of the quantity of the initial materials introduced and the calcining conditions. Generally, they are as follows:

| | |
|---|---|
| $CeO_2$: | 30% to 80% |
| $Ln_{2-x}Ce_xSi_2O_7$: | 12% to 60% |
| $Ln_2O_3$: | 0 to 15% |
| $SiO_2$: | 1.5% to 8% |

The compositions described in French Patent No. 2,549,846 are obtained by a process which consists of simultaneously mixing a cerium salt solution, a basic solution, and an aqueous solution of the salt of at least one trivalent rare earth or yttrium compound and a solution of at least one oxygen derivative of silicon capable of forming insoluble rare earth compounds. The reaction precipitate is then filtered, dried and calcined at a temperature in excess of 850° C.

In the first stage of the process, the different reagents are mixed. The solution of the cerium salt, the basic solution and the aqueous solution of the trivalent rare earth salt are as characterized above.

The proportion between the basic solution and the solution of the cerium salt should be such that the number of equivalents of the basic solution introduced is greater than or equal to the number of cerium equivalents introduced at the same time. It may be advantageous to use an excess of more than 5% of basic equivalents relative to the cerium equivalents. The pH of the reaction medium may vary between 5 and 10. Advantageously, the pH is maintained between 7 and 9. It may be particularly advantageous to control the pH within these limits at the value constant within ±0.1 pH units.

The proportion between the solution of the cerium salt and the aqueous solution of the trivalent rare earth salt or salts is such that the proportion between the cerium dioxide and the rare earth oxides ($CeO_2$+$Ln_2O_3$) varies between 60% and 85% by weight.

A solution of at least one oxygen derivative of silicon may be any aqueous solution of an oxygen derivative of silicon capable of forming insoluble rare earth compounds. The silicon derivative or derivatives should be soluble in water. The following compounds may be used: silicon dioxide, silicic acid, alkaline metal silicates and the like. More precisely, amorphous silica, metasilicic acid, metadisilicic acid, sodium orthosilicate, sodium silicate of the formula $Na_2O$, $xSiO_2$ in which x varies from 3 to 5, sodium metasilicate, sodium dimetasilicate, potassium metasilicate, potassium metadisilicate, potassium tetrasilicate, and the like are utilized. These salts may be in the anhydrous or the hydrated form. Preferably, sodium silicate, $Na_2O$, $4SiO_2$ is used. The concentration of the solution of the oxygen derivative or derivatives of silicon is not critical. The concentration may vary within wide limits and is expressed in moles/liter of $SiO_2$. It is generally between about 0.1. and 2.0.

The proportion of solution of oxygen derivative or derivatives of silicon and the aqueous solution of the trivalent salt or salts of rare earths is defined as a ratio. This ratio is that of the silicate equivalents ($SiO_3^=$) to the trivalent rare earth equivalents. It is generally between about 0.1 and 1 and, preferably between about 0.2 and 0.6.

The mixing of the different solutions of the above cited reagents may be carried out in numerous ways. For example, the mixture may be prepared under agitation by adding continuously and separately the solution of the oxidizing agent, the solution of the salt or salts of rare earths, the solution of the oxygen derivative or derivatives of silicon and the basic solution. A premixture of the cerium salt solution and the solution of the salt or salts may also be prepared. This premixture may be added continuously to the reaction medium in parallel with the two other solutions. A premixture of the solution of the oxygen derivative or derivatives of silicon with the basic solution may also be prepared. If an oxidizing agent is used, it is possible to mix it into a solution such as the solution of the cerium salt and/or the solution of the salt or salts of rare earths. The oxidizing agent should not be mixed into the solution containing the base.

The operations of mixing, filtering and drying are carried out under the same above described conditions. The dry product is then calcined, either continuously or non-continuously, at a temperature of at least 850° C., but preferably at a temperature between 850° C. to 1050° C. The upper limit of the temperature range is not critical and may reach values as high as 1500° C.

The calcined product is then ground so that it will contain aggregates with dimensions of 0.2 $\mu$m to 5.0 $\mu$m. Generally, the size of the aggregates, expressed by the mean diameter, varies from 0.5 $\mu$m to 1.5 $\mu$m. The mean diameter is defined as a diameter such that 50% by weight of the aggregates have a diameter larger or smaller than the mean diameter.

Grinding may be accompanied by an operation of grain size selection which may be carried out at any time by the methods described above.

The ceric oxide compositions described in French Patent No. 2,545,830, which contain ceric oxide combined with at least one colorless oxide of another trivalent rare earth oxide, are also suitable for use in the present invention.

The following colorless rare earth oxides may be used such as the oxides of lanthanum, samarium, europium, gadolinium, dysprosium, thulium, ytterbium, lutecium, yttrium and the like. These oxides are usually in the sesquioxide form. It is also possible to use a mixture of these oxides. It is preferable, however, to use lanthanum sesquioxide.

The proportions of ceric oxide and the oxides of rare earths in the polishing compositions described in French Patent No. 2,545,830 may vary. The following proportions are suggested:

40% to 99.5% by weight ceric oxide and
0.5% to 60% by weight rare earth oxides.

However, it is preferred to use a composition containing:

85% to 98% by weight ceric oxide and
2% to 15% by weight rare earth oxides.

The compositions described in French Patent No. 2,545,830 are prepared by a process consisting of mixing simultaneously and continuously a cerium salt solution, a basic solution and a solution of at least one trivalent rare earth salt. The trivalent rare earth salts used are salts of lanthanides and yttrium, the oxide of which is colorless. The number of basic equivalents used is greater than or equal to the number of cerium and rare earth equivalents. The pH of the reaction medium is generally higher than 6. After mixing and obtaining a precipitate, the precipitate is then filtered, dried and calcined.

The first stage of the process consists of mixing the different reagents together. According to the process described in French Patent No. 2,545,830, an aqueous solution of a trivalent salt of at least one rare earth is added continuously to the reaction mixture. The rare earth may be added either individually or in a mixture with the cerium salt solution. This trivalent rare earth salt may be selected from the group consisting of the lanthanides and yttrium and is capable of forming a colorless oxide. The salt must be soluble under the conditions of the invention. The salts that are suitable for use in the invention, include chlorides or nitrates of lanthanum, samarium, europium, gadolinium, dysprosium, thulium, ytterbium, lutecium, yttrium and the like.

The concentration of the solution of the salt or salts of rare earths is not critical. It may vary within wide limits. However, it is preferable to have a concentration between 0.2 and 4 moles per liter.

The proportion of the basic solution and the solution of the cerium salt or the salt of rare earths should be prepared so that the number of the basic equivalents introduced be greater than or equivalent to the number of cerium and rare earth equivalents at the same time. It may be advantageous to use an excess higher than 5% of the basic equivalents relative to the cerium and rare earth equivalents. The pH of the reaction medium should be higher than 6, but should not exceed about 10. Advantageously, the pH is maintained between 7 and 9. It may be particularly advantageous to control the pH within these limits at a constant value $\pm 0.1$ pH units.

Mixing the different solutions of the above cited reagents may be carried out in numerous ways. For example, the mixture may be prepared under agitation by adding continuously and separately the solution of the cerium salt, optionally the solution of the oxidizing agent, the solution of the salt or salts of rare earths, and the basic solution. A premixture of the cerium salt solution and the solution of the salt or salts may also be prepared. This premixture is then added continuously to the reaction medium in parallel with the basic solution. If an oxidizing agent is used, it is possible to include it in the mixture with the solution of the cerium salt and/or the solution of the salt or salts of rare earths.

The temperature of the reaction medium is not critical and preferably is maintained between 10° C. and 95° C., in particular between 20° C. and 70° C.

The retention time of the mixture in the reaction medium is not critical and may vary within wide limits. Generally a retention time between 30 minutes and 2 hours is selected.

According to an embodiment of the process described in French Patent No. 2,545,830, the reaction mass may be aged for a certain period of time at a temperature between 10° C. and 95° C. and preferably between 20° C. and 80° C. before filtering. This period of time may vary from about 30 minutes to 2 hours. The aging operation is carried out under agitation.

The second stage of the process to obtain the composition described in French Patent No. 2,545,830 consists of filtering the reaction mass after the reaction, with the mass being present in the form of a suspension. The filter cake may then be washed with water.

The product obtained after filtering and optionally washing is then dried, either continuously or non-continuously. The drying temperature is preferably between 100° C. and 600° C. and lasts about 30 minutes and 2 hours.

The dried product is subsequently calcined either continuously or non-continuously at a temperature between 600° C. and 1200° C., preferably 950° to 1150° C. for a period between 30 minutes and 10 hours.

The calcined product is ground and optionally subjected to a grain size selection process as described in French Patent No. 2,549,846.

Another embodiment of the process of French Patent No. 2,545,830 consists of preparing the reaction mixture via two different procedures. The first procedure is to obtain a hot precipitate, while in the second procedure the precipitate obtained is cold. The precipitates obtained by these two procedures are then mixed together either before or after filtration. For more details concerning this embodiment, reference is made to French Patent No. 2,545,830.

According to the present invention, the polishing compositions contain as polishing agents either ceric oxide alone or ceric oxide in compositional form along with a boron compound.

The boron compound utilized in the present invention include preferably boric acids, such as orthoboric (or its precursor $B_2O_3$), metaboric, pyroboric or tetraboric acid, or metallic borates and in particular the metallic borates of the alkaline earth metals and of ammonium. These compounds may be in the anhydrous or hydrated form. In particular borates, hemiborates, monoborates, diborates, triborates, tetraborates, pentaborates of various metals, preferably of alkaline various metals and of ammonium are used. A double salt containing boron, in particular metallic fluoroborates, such as potassium fluoroborate may also be used.

Examples of the boron compounds suitable for use in the present invention include sodium metaborate, sodium metaborate tetrahydrate, sodium tetraborate, sodium tetraborate decahydrate or borax, sodium tetraborate pentahydrate, potassium metaborate, potassium pentaborate tetrahydrate, potassium tetraborate octahydrate, ammonium pentaborate tetrahydrate, and ammonium tetraborate tetrahydrate.

It is preferable to use orthoboric acid (or its precursor $B_2O_3$) and borax. The amount of boron compound used in the polishing composition of the present invention depends on the nature of the particular boron compound utilized. However, the quantity of boron compound must be sufficient to obtain an anti-settling and/or anti-caking effect.

It is readily determined by those skilled in the art that by mixing the products in different proportions and then effecting the tests described hereafter, the quantity of the boron compound may be obtained.

Generally, the quantity of the boron compound added, expressed by the weight of elemental boron relative to the weight of the polishing agent, varies from 0.05% to 5.0%. The upper limit is not critical, however, there is an advantage in exceeding 5.0%.

In order to obtain an anti-caking and anti-settling effect, it is desirable that the quantity of the boron compound be between 0.05% and 1.0%.

In their research, the present applicants have found that the quantity of the boron compound utilized may be reduced by adding a third additive, such as an aluminum silicate.

A preferred form of an embodiment of the present invention consists of a cerium based polishing composition, that contains a polishing agent based on ceric oxide, boron and aluminum silicate.

The aluminum silicates are preferably used in the form of clays. Examples of clays suitable for use in the present invention include the following:

kaolin type: kaolinite, dickite, nacrite, anauxite, halloysite, endelitte;

serpentine type; chrysolite, amesite, cronstedite, chamosite, garnierite;

montmorillonite type; montmorillonite (bentonite), beidellite, nontronite, hectorite, saponite, sauconite;

vermiculite or chlorite type; and attapulgite or sepiolite.

Preferably, clays of the montmorillonite, halloysite or attapulgite type are used. These clays have lamellar or stacked lamellae type structures. More preferably, montmorillonite is used.

It is also possible to use clays treated by an organic compound. Organophilic clays are products known and described in the literature. Examples include products marketed under the trademark BENTONE. These Bentone products are present in the form of platelets of clays of the montmorillonite type, the surfaces of which are bonded to an aliphatic or aromatic compound, which may also carry polar functional groups, e.g., alcohol, acids, esters, ketones and the like.

The quantity of the aluminum silicate used in the composition of the present invention, expressed by weight of the aluminum silicated relative to the weight of the polishing agent, may vary between 0.5% and 10.0%. It is preferable to use between 1.0% and 3.0%.

To prepare the composition, the components which are in the powder form, are simply mixed and introduced in any order.

The operation may be carried out in a powder mixer of any known type such as free fall mixers of the drum type, vertical or horizontal mixers with helical screws, horizontal mixers of the Lodige type, and the like.

According to another variation of the present invention, it is also possible to introduce the two additives, the boron compound and the aluminum silicate, prior to application as explained below.

The improved composition of the invention for the polishing of glass may be applied in any conventional manner. The composition is usually suspended in water since it is generally used in a spray-type of polishing system.

The preparation of the polishing bath is carried out simply by adding the powder composition to an aqueous medium under manual agitation or it is agitated by conventional means of agitation such as anchor, helical, turbine agitators, and the like.

The quantity of the composition introduced is expressed as the concentration of $CeO_2$ and varies from 30 g to 300 g per liter of bath.

The quality of the water used in the preparation of the polishing bath is not critical. It is preferable, however, to use soft water, i.e., water having a hardness of less than 30° TH, in order to maintain the composition in suspension.

The temperature of the bath is maintained at a temperature lower than 50° C. It is advantageous to work at low temperatures of about 20° C., since any rise in temperature accelerates the settling of the suspension.

The additives used in the polishing composition are introduced when the bath or solution is prepared. The polishing agent, the boron compound and the aluminum silicate are added separately in the form of a powder in an aqueous solution or suspension.

The composition of the invention yields good results such as the absence of caking, improved cleaning of the glass and satisfactory results in time relative to sedimentation and settlement without affecting polishing efficiency.

It is entirely suitable for the polishing of glass or similar materials. Furthermore, the presence of the two additives in the polishing composition improve the caking and settlement properties, but do not modify the technical performance of the polishing agent, and thus its application.

The composition of the invention can therefore be used in industrial optics, in the field of series eyeglass production and in prescription eyeglass making, and the glass industry, which includes crystal glass ware, mirror glass, flat glass. In particular, the composition is suitable for window glass and double glazing, automotive rearview mirrors and television screens.

Prior to presenting examples of the compositions of the invention, methods to determine the physico-chemical properties of the composition are described, as well as several tests used in the field of polishing.

a) Apparent tapped density

Apparent tapped density is determined according to DIN (German industrial standard) 53 194. The principle of the method is to introduce a known quantity of the powder product into a graduate test tube and to subject it to tapping under known conditions.

b) Specific surface

The specific surface is determined by the nitrogen adsorption method according to the ASTM D 3663-7 standard established by the BRUNAUER-EMMETT-TELLER method described in the Journal of the American Chemical Society, vol. 60, p. 309 (1938).

c) Grain size distribution 40 cm$^3$ of a suspension of the composition to be analyzed is prepared using 12 g per liter of distilled water containing 1 g/l sodium hexametaphosphate.

The agglomerates are then comminuted by ultrasound generated by an ANNEMASSE ultrasonic apparatus (80 watts, 26 KHz frequency). The duration of the operation is 5 minutes.

Grain size analysis is then carried out by means of a SEDIGRAPH 5000 D instrument. This apparatus measures the rate of particle sedimentation in the suspension and automatically displays these results in a cumulative percentage distribution as a function of the equivalent spherical diameters based on Stoke's law.

The apparatus determines, by means of a very fine beam of X-rays, the concentration of particles retained in suspension at different heights of sedimentation as a function of time. The logarithm of the intensity of the X-ray is generated electronically and recorded, then displayed linearly as "cumulative percentages" (as less than) on the Y axis of a XY recorder. To limit the time required for the analysis, the sedimentation cell is continuously in motion, so that the depth of the sedimentation cell is inversely proportional to time. The motion of the cell is synchronized with the X axis of the recorder to directly indicate the equivalent spherical diameter corresponding to the time elapsed at a given depth of sedimentation. The dimensional information is presented on a 3 module log chart.

The mean diameter $d_{50}$ is then determined. It is defined as a diameter such that 50% by weight of the particles have a diameter larger or smaller than the mean diameter.

d) Retention in suspension

Into a test tube of 250 cm$^3$, the suspension of the composition to be tested is introduced in a proportion of 50 g/l, or 12.5 g powder in 250 cm$^3$ of water having a hardness of 28° TH at 20° C. After complete homogenization of the suspension, the settling rate is observed by means of a densitometer (graduation 1000 to 1100) as a function of time. The d=f(t) curve may be plotted.

$T_{50}$ is the numerical expression of the behavior of the product relative to its ability to remain in suspension. This time, expressed in decimal minutes, is the mean between the initial density and the final density of the clear liquid.

e) Initial compaction

To determine the index of compaction at ambient temperature, 500 cm$^3$ of the composition to be tested is prepared in a stainless steel beaker in a proportion of 100 g/l in deionized water. The suspension is homogenized by agitation for 15 minutes. After standing for 24 hours to initiate settling, the suspension is agitated by controlled mechanical agitation using a flat agitator (150 rpm, 3 minutes) to resuspend the product. The deposit should not be disturbed by the blade of the agitator. The supernatant is then discarded.

The fraction which is not in suspension is then dried in an oven for at least 2 hours and then weighed.

The index of compaction (C) is the percentage representing this fraction of the dry product relative to the quantity of the polishing composition initially introduced.

An index of compaction of less than or equal to 20 is considered acceptable and an index less than 5 is desired.

f) Caking index

To determine the caking index, the suspension used to prepare the polisher (see the following test) is collected in a stainless steel beaker. After standing for 24 hours to initiate settling, the product is resuspended by controlled mechanical agitation (250 rpm, 5 minutes). The supernatant is discarded and the beaker is placed in an oven to dry the unsuspended fraction.

The caking index (IC) is the percentage representing this fraction relative to the quantity of the composition initially introduced.

A caking index less then or equal to 20 is acceptable and a value of less than 5 is preferred.

h) Cleaning

The test of the adherence of the polishing powder, designated the "cleaning test", simulates the difficulties encountered by the user in cleaning the glass after polishing, and in certain cases, the difficulty associated with the drying between the polishing phase and the cleaning phase.

A suspension of the polishing composition to be tested is prepared having the consistency of a fluid sludge by dispersing 8 g of said composition in 4 cm$^3$ of deionized water. The consistency is more pasty if a clay is present.

Five sheets of glass of ordinary quality (window glass) are washed very carefully with a conventional detergent, rinsed with deionized water and alcohol and then dried.

A "thin layer" of the suspension is applied to $\frac{3}{4}$ of the surface of each plate with a spatula.

The plates are then placed into an oven at 100° C. for 15 minutes. At ambient temperature the plates are washed under a water jet (340 l/h) until all of the crust is detached.

The problem of adherence of the polishing composition is indicated by the presence of a permanent haze or the surface of the glass. If there is little or no adherence, the surface is clear.

i) Polishing efficiency relative to polyurethane foam (MPU)

A CMV model ICM 7 industrial machine equipped with two brushes and a convex polishing head is used. A pump supplies the surface of the glass to be polished with the suspension of the polishing composition to be tested.

Operating conditions are as follows:

| | |
|---|---|
| velocity of head | 1500 rpm |
| velocity of brushes | 1000 rpm |
| pressure | 1200 g/cm$^2$ |
| concentration of suspension | 50 g/l |
| water hardness | 28° TH |
| temperature | 20° C. |
| polisher | polyurethane foam MPU LP 46 (thickness 1.3 mm) |
| glass to be polished | White crown |
| diameter | 55 mm |
| pump flow rate | 3.8 to 4 l/min |
| test duration | 3 min |
| duration of the total test | 60 min. |

The concave faces of the two glass specimens are worked together for 3 minutes, then the removed material is weighed. The test is repeated over a duration of one hour.

The average weight removed is related to

| | |
|---|---|
| unit of weight: | mg |
| surface unit: | dm$^2$ |
| unit of time: | min |

The curve of polishing efficiency is plotted as a function of working time. From this curve, polishing efficiency is expressed as the mean of the first 10 results.

To better illustrate the embodiments of the present invention, different nonlimiting examples are given below.

Examples 1 to 9 illustrate polishing compositions containing a boron compound only. In Examples 10 to 15, both a boron compound and an aluminum silicate (clay or organophilic clay) are included.

For comparison, in Experiments A, B and D the results obtained with a polishing agent without an additive are given and in Experiments C and E the polishing agent is combined with an aluminum silicate (clay or organophilic clay) only.

EXAMPLES 1 TO 8

Experiment A

In this series of experiments improved polishing compositions containing a boron compound only were prepared.

In Examples 1 to 4, the boron compound is sodium tetraborate decahydrate or borax.

In Examples 5 to 8, the boron compound is orthoboric acid, referred to hereafter as boric acid.

As the polishing agent, a ceric oxide composition containing 68.5% ceric oxide was used. This composition, referred to hereafter as Cerox S was prepared according to French Patent No. 2,549,846.

Cerox S has the following characteristics:

| chemical composition: | |
|---|---|
| ceric oxide: | 62% |
| lanthanum oxide: | 28% |
| rare earth oxide: | 90% |
| silica: | 10% |
| apparent tapped density: | $d_A = 1.4$ |
| specific surface: | s.s = 3.9 m$^2$/g |
| mean particle diameter: | $d_{50} = 1.3$ μm |
| % of particle with a diameter larger than | |
| 15 μm: | less than 0.1% |

The compositions of Examples 1 to 8 were prepared as follows:

200 grams Cerox S was introduced into a 1 liter polyethylene flask. The quantity of boron compound added is indicated in Table I. Mixing was carried out under agitation by a TURBULA mixer. The duration of the mixing operation was 30 minutes. The powder obtained was subjected to the above defined tests. Results are compiled in Table I.

The results were compared with those of a polishing composition with Cerox S, but without an additive (Experiment A). As seen in Table I the improvement in (Experiment A) compacting behavior is significant if 5.0% borax (0.55% boron) or 0.5% boric acid (0.09% boron) is used and the improvement in the compacting and caking behavior is significant if 5.0% borax (0.55% boron) or 2.0% boric acid (0.36% boron) is used.

EXAMPLE 9

Experiment B

In the following composition the additive was boric acid and the polishing agent was a ceric oxide composition containing 66% ceric oxide. This composition was prepared according to French Patent No. 2,472,601 and is available commercially under the trade name Cerox 1650.

More precisely, the characteristics of Cerox 1650 are the following:

| chemical composition: | |
|---|---|
| rare earth oxides | 94% |
| ceric oxide | 66% |
| lanthanum oxide | 19% |
| neodymium oxide | 9% |
| praseodymium oxide | less than 0.0001% |
| fluoride as F⁻ | 4% |
| phosphate as $P_2O_5$ | 4% |
| aluminum oxide: | 10.5% |
| ferric oxide: | 0.9% |
| calcium oxide: | 2.3% |
| sodium oxide: | 2.4% |
| potassium oxide: | 1.2% |
| ignition loss: | 7.5% |

TABLE II

| Experiment Example | Boron compound | % boron compound/Cerox 1650 | $T_{SO}$ min | Compaction % | Caking IC % | Polishing efficiency MP mg/dm²/min |
|---|---|---|---|---|---|---|
| B | — | — | 2.5 | 10 | 40 | 380 |
| 9 | boric acid | 2 | 3.0 | 7 | <5 | 370 |

It is present in the form of white flakes and has a density of 2.6. The composition was prepared by mixing the powders as described above. 200 grams Cerox S was introduced into a 1 liter polyethylene flask. 4 grams Veegum T was added and the mixture was agitated for 15 minutes, with a TURBULA agitator. Subsequently,

TABLE I

| Experiment Example | Boron compound | % boron compound/Cerox S | $T_{SO}$ min | Compaction % | Caking IC % | Cleaning |
|---|---|---|---|---|---|---|
| A | — | 0 | 5 | 70 | % | poor |
| 1 | borax | 0.5 | 4 | 82 | 32 | good |
| 2 | borax | 1.0 | 3 | 75 | 35 | good |
| 3 | borax | 2.0 | 3 | 23 | 39 | good |
| 4 | borax | 5.0 | 2 | <5 | <5 | very good |
| 5 | boric acid | 0.5 | 6 | 8 | 34 | |
| 6 | boric acid | 1.0 | 4.5 | 8 | 36 | |
| 7 | boric acid | 1.5 | 5 | 6 | 33 | |
| 8 | boric acid | 2.0 | 5.5 | 8 | <5 | |

| apparent tapped density: | $d_A = 1.6$ |
|---|---|
| specific surface: | s.s. = 3.2 m²/g |
| mean particle diameter: | $d_{50} = 1.0$ μm |
| % of particles with diameters larger than 15 μm: | less than 0.1% |

The improved polishing composition containing 2% boric acid was prepared as in Examples 1 to 8.

The results obtained are compiled in Table II.

They were compared with those of a Cerox 1650 polishing composition without an additive (Experiment B). Improvements in compacting and caking are noted without loss of polishing efficiency.

EXAMPLE 10

Experiment C

The polishing composition illustrated in the present example contained Cerox S as described in Examples 1 to 8, borax and as the aluminum silicate, Veegum T marketed by The VANDERBILT Co.

Veegum T is a Montmorillonite type clay; it is an aluminum and magnesium silicate. Its chemical composition expressed of weight of the oxides is as follows:

| silica: | 63.00% |
|---|---|
| magnesium oxide: | 10.5% |

1 g borax was added and the agitation continued for 30 minutes. The powder obtained was subjected to different tests. Results are displayed in Table III.

As a comparison, the results obtained with a Cerox S polishing composition without an additive (Experiment A) and with a polishing composition containing only clay and Veegum T as the additive are also listed in Table III (Experiment C).

Table III indicates that by using a boron compound and clay it is possible to obtain good results relative to compacting and caking. A smaller quantity of boron (0.5% in place of 5%) is also utilized.

As a comparison, it is noted that the use of a clay alone improved the caking behavior, but compaction remained high. In addition, the polishing efficiency was reduced.

EXAMPLES 11 TO 13

In this series of experiments, improved polishing compositions containing a boron compound and an aluminum silicate were prepared.

In Examples 11 and 12, the boron compound was boric acid and was used in proportions of 0.2 and 2%. In Example 13, the borax was in a proportion of 0.5%.

In all of Examples 11 to 13, the aluminum silicate is 2% Veegum T. The polishing agent was Cerox 1650 as defined in Example 9. The compositions were prepared by mixing the powders as described above.

TABLE III

| Experiment Example | Boron compound | % boron compound/Cerox S | % Al silicate/Cerox S | $T_{SO}$ min | Compaction % | Caking % | Polishing efficiency MP mg/dm²/min |
|---|---|---|---|---|---|---|---|
| A | — | 0 | — | 5 | 70 | 40 | 410 |

TABLE III-continued

| Experiment Example | Boron compound | % boron compound/Cerox S | % Al silicate/Cerox S | $T_{SO}$ min | Compaction % | Caking % | Polishing efficiency MP mg/dm²/min |
|---|---|---|---|---|---|---|---|
| C | — | 0 | Veegum T 1 | 4 | 80 | <5 | 380 |
| 10 | borax | 0.5 | Veegum T 2 | 5.5 | 20 | <5 | 410 |

Cleaning is poor for A and C and good for 10.

200 grams Cerox 1650 was introduced into a 1 liter polyethylene flask. 4 grams Veegum T was added and the mixture was agitated for 15 minutes by a TURBULA mixer. The boron compound was then added in an adequate quantity and agitation continued for 30 minutes. The powder obtained was subjected to different tests. The results obtained are compiled in Table IV. The results were compared with a Cerox 1650 polishing composition without an additive (Experiment B).

The polishing compositions of the invention described in Table IV have improved properties; good suspension stability and the absence of compacting and caking.

EXAMPLE 14
Experiment D

In the composition of Example 14, borax, clay (Veegum T) and as the polishing agent a ceric oxide composition containing 92% ceric oxide were used. The latter composition was marketed under the trade name Cerox GG and was prepared according to French Patent No. 2,545,830. Cerox GG has the following characteristics:

| chemical composition | |
|---|---|
| ceric oxide: | 92% |
| lanthanum sesquioxide: | 8% |
| apparent tapped density: | $d_A = 1.6$ |
| specific surface: | s.s. = 6.0 m²/g |
| mean particle diameter: | $d_{50} = 0.5$ μm |
| % of particles with diameters | |
| larger than 15 μm: | less than 0.1% |

The improved polishing composition containing 0.5% borax and 2.0% Veegum T was prepared as in the preceding examples, beginning with 200 g Cerox GG.

Results obtained were compiled in Table V.

The results were compared with those of a Cerox GG polishing composition with an additive (Experiment D).

It was noted that the polishing composition of the invention described in Table V improves compacting and caking properties, while maintaining polishing efficiency.

EXAMPLE 15
Experiment E

The polishing composition of the invention illustrated in the present example contained Cerox S as described in Examples 1 to 8, borax and as the aluminum silicate, BENTONE EW.

BENTONE EW is an organophilic clay. It is present in the form of flakes of a clay (bentonite), the faces of which are bonded to a long chain organic compound.

The composition was prepared by mixing the powders as described in Example 10.

The results obtained are listed in Table VI.

As a comparison, in Table VI the results obtained with a Cerox S polishing composition without additives (Experiment A) and with a polishing composition containing only the organophilic clay BENTONE EW (Experiment E) are also shown.

TABLE IV

| Experiment Example | Boron compound | % boron compound/Cerox S | % Al silicate/Cerox S | $T_{SO}$ min | Compaction % | Caking % | Polishing efficiency MP mg/dm²/min |
|---|---|---|---|---|---|---|---|
| B | — | — | — | 2.5 | 10 | 40 | 380 |
| 11 | boric acid | 0.2 | Veegum T 2 | 3.0 | <5 | <5 | 380 |
| 12 | boric acid | 2.0 | Veegum T 2 | 3.0 | <5 | <5 | 340 |
| 13 | borax | 0.5 | Veegum T 2 | 3.2 | <5 | <5 | 380 |

TABLE V

| Experiment Example | Boron compound | % boron compound/Cerox GG | % Al silicate/Cerox GG | $T_{SO}$ min | Compaction % | Caking % | Polishing efficiency MP mg/dm²/min |
|---|---|---|---|---|---|---|---|
| D | — | — | — | 7.0 | 25 | 20 | 280 |
| 14 | borax | 0.5 | Veegum T 2.0 | 3.5 | <5 | <5 | 300 |

TABLE VI

| Experiment Example | Boron compound | % boron compound/Cerox S | Al silicate | % Al silicate/Cerox S | $T_{50}$ | Compacting | Caking | Polishing efficiency mg/dm²/min |
|---|---|---|---|---|---|---|---|---|
| A | — | 0 | — | 0 | 5 | 70 | 40 | 410 |

TABLE VI-continued

| Experiment Example | Boron compound | % boron compound/Cerox S | Al silicate | % Al silicate/Cerox S | $T_{50}$ | Compacting | Caking | Polishing efficiency mg/dm²/min |
|---|---|---|---|---|---|---|---|---|
| E | — | — | Bentone EW | 1 | 4 | 40 | <5 | 380 |
| 15 | borax | 0.5 | Bentone EW | 2 | 7 | 25 | <5 | 410 |

As illustrated in Table VI the addition of borax and of BENTONE EW to the polishing agent improves the compacting and caking behavior while maintaining good polishing efficiency.

While the invention has been described in detail and with reference to specific embodiments thereof, it will be apparent to one skilled in the art that various changes and modifications can be made therein without departing from the spirit and the scope thereof.

What is claimed is:

1. A cerium based polishing composition comprising a polishing agent comprising a ceric oxide and a boron compound.

2. The composition as defined by claim 1, wherein said polishing agent comprises ceric oxide or a composition containing ceric oxide.

3. The composition as defined by claim 1, wherein said ceric oxide is present in the composition in an amount of at least 30% by weight.

4. The composition as defined by claim 3, wherein said ceric oxide is a powder having particle dimensions of less than 20 μm.

5. The composition as defined by claim 4, wherein said ceric oxide is a powder having particle dimensions between 0.1 μm and 10 μm.

6. The composition as defined by claim 5, wherein said ceric oxide has a specific surface area of from about 1 m²/g to 35 m²/g.

7. The composition as defined by claim 6, wherein said ceric oxide has a specific surface area of between about 3 m²/g to 10 m²/g.

8. The composition as defined by claim 2, wherein said ceric oxide composition comprises a crystallographic phase of a $CeO_2$ based composition and a crystallographic phase comprising a pyrosilicate of rare earth values corresponding to the formula $Ln_{2-x}Ce_xSi_2O_7$, wherein Ln is at least one element selected from the group consisting of lanthanides, yttrium, and mixtures thereof, and x is greater than or equal to 0 and less than 2.0.

9. The composition as defined by claim 8, wherein said composition comprises between 75% to 95% by weight of rare earth values in the form of oxides and has a percentage of ceric oxide relative to the total weight of rare earth oxides of from about 60% to 85%, and from about 5% to 25% by weight silicon expressed as $SiO_2$.

10. The composition as defined by claim 2, said ceric oxide composition further comprising at least one colorless oxide of a rare earth value other than cerium.

11. The composition as defined by claim 10, wherein said ceric oxide composition comprises from about 40% to 99.5% by weight ceric oxide and from about 0.5% to 60% by weight of rare earth oxides.

12. The composition as defined by claim 1, wherein said boron compound is selected from the group consisting of boric acids, metallic borates and ammonium borates, said borates being present in an anhydrous or a hydrated form.

13. The composition as defined by claim 11, wherein said boron compound is selected from the group consisting of orthoboric acid or its precursor $B_2O_3$, metaboric acid, pyroboric acid, tetraboric acid, sodium tetraborate, sodium tetraborate decahydrate, sodium tetraborate pentahydrate, sodium metaborate, sodium metaborate tetrahydrate, potassium metaborate, potassium pentaborate tetrahydrate, potassium tetraborate octahydrate, ammonium pentaborate tetrahydrate and ammonium tetraborate tetrahydrate.

14. The composition as defined by claim 12, wherein said boron compound is orthoboric acid or its precursor $B_2O_3$.

15. The composition as defined by claim 12, wherein said boron compound is borax.

16. The composition as defined by claim 1, wherein said boron compound expressed as elemental boron is present in an amount of between 0.05% to 5% by weight relative to said polishing agent.

17. The composition as defined by claim 16, wherein said boron compound is present in an amount between 0.05% to 1.0%.

18. The composition as defined by claim 1, further comprising an aluminum silicate.

19. The composition as defined by claim 18, wherein said aluminum silicate is a clay or an organophilic clay.

20. The composition as defined by claim 19, wherein said clay is selected from the group consisting of kaolin, serpentine, montmorillonite, vermiculite, halloysite, chlorite, attapulgite and sepiolite clays.

21. The composition as defined by claim 18, wherein said clay is selected from the group consisting of montmorillonite, halloysite and attapulgite clays.

22. The composition as defined by claim 21, wherein said clay is a montmorillonite clay.

23. The composition as defined by claim 18, wherein said aluminum silicate expressed as aluminum silicate is present in an amount of between 0.5% and 10% by weight relative to said polishing agent.

24. The composition as defined by claim 23, wherein said aluminum silicate is present in an amount of between 1.0% to 3.0% by weight.

25. A process for preparing a polishing agent containing ceric oxide comprising the steps of:
 (a) mixing simultaneously and continuously a solution of a cerium salt, a solution containing a base, and a solution of at least one acid, salt or mixture of an acid and salt, the anion or anions of which are capable of forming insoluble rare earth compounds, the number of basic equivalents in said solution being at least equal to the number of cerium equivalents at a pH of at least 6.0 to form a precipitate;
 (b) filtering said precipitate;
 (c) drying said precipitate; and
 (d) calcining said precipitate.

26. The process as defined by claim 25, wherein an aqueous solution of at least one trivalent rare earth value is added.

27. The process as defined by claim 25, wherein said anion is selected from the group consisting of fluoride, sulfate, borate and phosphate.

28. A process for preparing a polishing agent containing ceric oxide as a composition, said process comprising the steps of:
(a) mixing simultaneously a solution of a cerium salt, a solution containing a base, a solution containing an aqueous solution of a salt of at least one trivalent rare earth compound or yttrium and an aqueous solution of at least one oxygen derivative of silicon capable of forming insoluble rare earth compounds for form a precipitate;
(b) filtering said precipitate;
(c) drying said precipitate; and
(d) calcining said precipitate at a temperature of at least 850° C. or higher.

29. A process for preparing a polishing agent containing a composition containing a ceric oxide and at least one colorless oxide of a rare earth value comprising the steps of;
(a) mixing simultaneously and continuously a solution of a cerium salt, a solution containing a base, and a solution of at least one trivalent salt of a rare earth value, said trivalent salt being selected from the group consisting of the lanthanides, yttrium, and mixtures thereof, the oxide of which is colorless and having the number of basic equivalents higher than or equal to said cerium and rare earth equivalents, at a pH of at least 6.0 to form a precipitate;
(b) filtering said precipitate;
(c) drying said precipitate; and
(d) calcining said precipitate.

30. A process for the preparation of a polishing composition comprising:
(a) mixing a polishing agent containing ceric oxide with a solution to form a polishing bath; and
(b) adding to said polishing bath a boron compound.

31. The process as defined by claim 30, wherein said process further comprises adding aluminum silicate to said polishing bath.

32. The process as defined by claim 30, wherein said process further comprises the step of initially preparing a powder mixture of said polishing agent and said boron compound.

33. The process as defined by claim 30, wherein said polishing agent, expressed as $CeO_2$, is present in an amount of between 30 grams to 300 grams per liter of said bath.

* * * * *